United States Patent Office 3,292,475
Patented Dec. 20, 1966

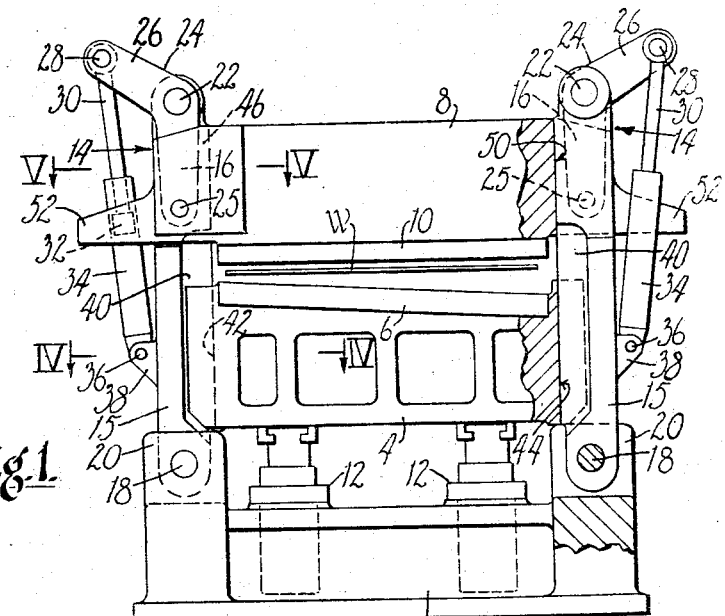

3,292,475
GUILLOTINE SHEAR OF THE UPCUT TYPE
Hugh Macdonald Ross, Poole, Dorset, England, assignor to The Loewy Engineering Company Limited, Bournemouth, England, a company of Great Britain
Filed Apr. 20, 1965, Ser. No. 449,438
Claims priority, application Great Britain, Apr. 21, 1964, 16,464/64
7 Claims. (Cl. 83—368)

This invention relates to guillotine shears and, in particular, to guillotine shears for cutting flat rolled metal articles, such as sheets, plates or strip, across their width.

Guillotine shears for the purpose stated are of one of two types, depending on whether the upper or the lower shear blade performs the cutting stroke. In guillotine shears of the upcut type, the upper blade is normally arranged close to the plane of feed and support of the pieces to be cut, in order to make the cutting stroke as short as possible. The distance between the top blade and this plane is therefore usually not much greater than the thickness of the pieces to be cut.

It sometimes occurs that the leading end of a flat rolled piece of metal curls up on leaving the last stand of the rolling mill and cannot then enter an upcut shear without fouling the top blade. This makes it necessary to flatten the curled end before it can be entered into the shear. This takes time and may lead to appreciable delays, with a consequent loss of output.

It is an object of the present invention to provide a guillotine shear of the upcut type, in particular for cutting flat rolled articles, such as sheets, plates or strip, which is free from the above-mentioned drawback and allows the entry of such articles into the shear, even if their leading ends are curled.

According to the present invention, a guillotine shear of the upcut type for cutting flat, rolled articles is provided with separate means for lifting the upper blade of the shear away from the plane of feed and support of the pieces to be cut, while the lower blade remains at rest.

The aforesaid lifting means may also form the side members of the shear which side members support a carrier on which the upper blade is mounted, so that the conventional fixed side members of guillotine shears can be dispensed with.

The lifting means provided in accordance with the invention may include toggles pivoted to the base of the shear and to a carrier for the upper blade respectively, the three pivots of a toggle being preferably so arranged relative to each other in the shear that the pivot points are all in the same vertical line when the upper blade is in its lowermost position and thus ready for a cut, and that the toggles are collapsed for lifting said blade. In this way, the carrier for the upper blade is supported during a cut with the stiffness and rigidity required for resisting the forces to which the carrier is subjected during a shearing operation.

The links of the toggles may be moved from their in-line position to their collapsed position by hydraulic ram-and-cylinder units. Preferably, these units are double-acting. By keeping the return sides of the rams under pressure during a shearing stroke, any upward thrust acting on the top blade carrier during that stroke will be resisted.

An embodiment of the invention will now be described with reference to the accompanying drawings, in which:

FIG. 1 is a front elevation of a guillotine shear of the upcut type in accordance with the invention, ready for a cut, parts of the shear being shown in section.

FIG. 2 is an end elevation of the shear of FIG. 1.

FIG. 3 is a partial front elevation of the shear of FIG. 1 showing the upper blade in its raised position.

FIG. 4 is a section along line IV—IV of FIG. 1.

FIG. 5 is a section along the line V—V of FIG. 1.

The guillotine shear shown in the drawings comprises a base 2, a lower crossbeam 4 as the carrier for a lower blade 6, and an upper crossbeam 8 as the carrier for an upper blade 10. The crossbeam 4 and the blade 6 are raised for cutting a workpiece W by hydraulic ram and cylinder units 12 arranged below that crossbeam, or by any other suitable means. Hydraulic ram-and-cylinder units are arranged below the crossbeam 4 for raising the latter together with the blade 6, and thereby to effect a cut on a workpiece W. Normally, when the shear is at rest, the lower blade 6 is retracted below the top level of transport rollers 13 which feed a workpiece to and from the shear and support it during the cutting operation. The cutting edge of the lower blade 6 is shown as slanted, as is well-known practice with shears of this type.

As is evident from FIG. 2, the distance between the top level of the transport rollers 13 and the upper blade 10 is very small, and not much greater than the thickness of the workpiece W to be cut. The gap formed between the two blades 6 and 10 is therefore not large enough to allow the entry therein of a workpiece W whose leading edge is curled, as shown in dotted lines at the right of FIG. 2.

In order to allow for this contingency, lifting means are provided which permit raising of the upper crossbeam 6 and the upper blade 10 away from the lower blade 6 and the transport rollers 13, independently of the lower blade 6, and while the latter is in its retracted position.

The lifting means comprise toggles 14, one at each side of the shear. Each toggle has links 15 and 16. The links 15 considerably exceed in length the links 16, and are pivoted at their enlarged lower ends to shafts 18 supported in lugs 20 on the base 2 (FIGS. 2 and 3).

The upper end of each link 15 is pivoted by a pin 22 to the link 16 which forms one of the two levers of a bell crank 24. The link 16 is also connected, by pins 25, to the upper crossbeam 8. The other lever of bell crank 24 consists of an arm 26 which is pivoted at 28 to a rod 30 of a ram 32. The latter is displaceable in a cylinder 34 which is pivotally connected at 36 to a lug 38 on link 15. As will be seen from FIG. 2, two toggles 14 and two bell cranks 24 are arranged on each side of the shear.

The lower parts of the links 15 are formed with tongues 40 adapted to enter slots 42 fromed in the lower crossbeam 4 and to abut against the inner end-face 44 of these slots (FIG. 4), when the toggles 14 are in their in-line positions. Likewise, the upper parts 46 of the links 15 are adapted to enter slots 48 formed in the upper crossbeam 8 and to abut against the inner end-face 50 of these slots (FIG. 5). The slots 48 extend between ears 52 provided on the upper crossbeam 8. In this way, the links 15 are guided in the two crossbeams 4 and 8 in the vertical direction, whereby sideways swaying of the links is prevented, and the toggles 14 stabilized. This is particularly important, if, as in the embodiment shown, the toggles 14 serve also to support the upper crossbeam 8 with its blade 10.

During a shearing operation, the hydraulic motors 12 are actuated to raise the lower crossbeam 4 with its blade 6 and thereby shear a workpiece W in two. The shearing force is then transmitted by the upper crossbeam 8 through the pins 25 to the links 16 of the bell cranks 24 and thence through pins 22 in links 15 to the shafts 18 and the base 2. During a shearing stroke, the links 16 are in compression, and the links 15 under tension. Upward pressure on the rams 32 in cylinders 30 overcomes the upward thrust which acts on the upper crossbeam 8 during a shearing operation.

If a workpiece W to be sheared has a curled-up leading edge, as indicated at the right of FIG. 2, the upper crossbeam 8, together with the upper blade 10, is raised by the toggles 14 before the workpiece is entered into the shear. This is effected by pushing the rams 32 downwards, so that the rods 30 cause the bell cranks 24 to rock about their pins 25 into the position shown in FIG. 3 and the links 15 to swing outwards about the shafts 18. The crossbeam 8 and the blade 10 are now raised sufficiently to allow the passage of the curled-up edge through the gap below the blade 10. Once the workpiece W is in position underneath the blade 10, the rams 32 are reversed and the parts of the shear are returned to the positions shown in FIG. 1 in which the blades are ready for a shearing operation.

It will be noted from FIG. 3 that even when the crossbeam 8 is raised, the tongues 40 of the links 15 remain with their lower ends in the slots 42, and the portions 46 of these links in the slots 48.

It will be seen from the foregoing that in the guillotine shear according to the embodiment shown, the lifting means, i.e., the links 15 of the toggles 14, take the place of the side members of the frame of conventional shears of the upcut type, inasmuch as they act as permanent supports for the upper crossbeam 8. The toggles, therefore, perform a dual function in this shear.

For automatic operation of the lifting means according to the invention, a limit switch may be provided in the path of the workpiece towards the shear. This switch may be so arranged as to be contacted only if the workpiece has a curled-up edge, the switch being preferably of the type having a flexible contactor. Operation of the switch actuates a valve for the control of the feed of a pressure medium to the cylinders 34. A similar switch may be provided at the exit side of the shear to actuate a valve for the reversal of the rams 32 in the cylinders 34 once the curled-up edge of a workpiece has passed the shear and the workpiece is ready for a cut.

The invention is capable of various modifications. While in the embodiment shown the toggles are so arranged in the shear that the planes of their movement are parallel to the blades 6 and 10, they may be arranged instead so that their planes of movement are perpendicular to those blades, in which latter case the toggles may be duplicated at each side of the shear.

I claim:

1. A guillotine shear of the upcut type, comprising a stationary base, a lower blade-carrier, an upper blade-carrier, means for moving said lower blade-carrier relative to said base for effecting a cut, and means operable independently from said moving means for lifting said upper blade-carrier away from said lower blade-carrier, said lifting means comprising toggles, each toggle having a first and a second link and a knee-joint between said two links, said first link being pivoted to said base and said second link being pivoted to said upper blade-carrier, the first links of said toggles acting as struts for supporting said knee-joints, and said upper blade-carrier and said second links suspending said upper blade-carrier from said knee-joints, and means for moving said toggles from a stretched position into a collapsed position, whereby said upper blade-carrier is lifted away from said lower blade-carrier.

2. A guillotine shear of the upcut type as claimed in claim 1, in which the links of said toggles are so arranged relative to each other that the pivoted ends of said links and their knee-joints are in the same vertical line when said upper blade-carrier is in its lowermost position.

3. A guillotine shear of the upcut type according to claim 1, in which the means for moving said toggles from the stretched into the collapsed position comprise piston-and-cylinder units in which the cylinders are pivoted to the first links of said toggles, and the piston rods to the second links.

4. A guillotine shear of the upcut type as claimed in claim 1, in which said first links are provided with means for guiding said lower blade-carrier during its cutting stroke.

5. A guillotine shear of the upcut type according to claim 1, in which said second links are provided with means for preventing movement of said upper blade-carrier relative to said second links in a direction perpendicular to the cutting plane.

6. A guillotine shear of the upcut type according to claim 3, in which said piston-and-cylinder units are double-acting, so that pressure on the return side of said pistons during the working stroke resists the upward thrust on the upper blade-carrier.

7. A guillotine shear of the upcut type according to claim 1, in which automatic means are provided, positioned in advance of said shear, which means are released when a workpiece to be cut has a curled leading edge.

References Cited by the Examiner

UNITED STATES PATENTS

| | | | |
|---|---|---|---|
| 482,113 | 9/1892 | Aiken | 83—530 |
| 860,009 | 7/1907 | Becker | 83—527 |
| 2,371,411 | 3/1945 | Rhodes | 83—625 X |
| 2,574,501 | 11/1951 | Seybold et al. | 83—642 X |

WILLIAM W. DYER, JR., *Primary Examiner.*

J. M. MEISTER, *Assistant Examiner.*